US009825306B2

(12) United States Patent
Chen et al.

(10) Patent No.: US 9,825,306 B2
(45) Date of Patent: *Nov. 21, 2017

(54) MIXED IONIC AND ELECTRONIC CONDUCTOR BASED ON SR2FE2-XMOXO6 PEROVSKITE

(71) Applicant: University of South Carolina, Columbia, SC (US)

(72) Inventors: Fanglin Chen, Irmo, SC (US); Qiang Liu, Columbia, SC (US)

(73) Assignee: University of South Carolina, Columbia, SC (US)

( * ) Notice: Subject to any disclaimer, the term of this patent is extended or adjusted under 35 U.S.C. 154(b) by 761 days.

This patent is subject to a terminal disclaimer.

(21) Appl. No.: 14/295,412

(22) Filed: Jun. 4, 2014

(65) Prior Publication Data

US 2014/0287345 A1    Sep. 25, 2014

Related U.S. Application Data

(62) Division of application No. 13/020,356, filed on Feb. 3, 2011, now Pat. No. 8,778,560.

(60) Provisional application No. 61/337,365, filed on Feb. 3, 2010.

(51) Int. Cl.
  $H01M\ 4/90$   (2006.01)
  $B05D\ 5/12$   (2006.01)
  $H01M\ 8/12$   (2016.01)

(52) U.S. Cl.
  CPC ........... *H01M 4/9033* (2013.01); *B05D 5/12* (2013.01); *H01M 4/90* (2013.01); *H01M 4/9025* (2013.01); *H01M 8/12* (2013.01)

(58) Field of Classification Search
  CPC .................................. H01M 4/9025–4/9033
  USPC ................................................ 429/488–489
  See application file for complete search history.

(56) References Cited

U.S. PATENT DOCUMENTS

2005/0181253 A1   8/2005  Finnerty et al.
2007/0056840 A1   3/2007  Anand et al.
2008/0299434 A1  12/2008  Katagiri et al.

OTHER PUBLICATIONS

Liu et al., "A Novel Electrode Material for Symmetrical SOFCs", Advanced Materials, vol. 22, No. 48, Dec. 2010, pp. 5478-5482.
Liu et al., "Perovskite $Sr_2 Fe_{1.5} Mo_{0.5} O_{6-\delta}$ as Electrode Materials for Symmetrical Solid Oxide Electrolysis Cells", International Journal of Hydrogen Energy, vol. 35, No. 19, Oct. 2010, pp. 10039-10044.
Xiao et al., "$Sr_2Fe_{4/3}Mo_{2/3}O_6$ as Anodes for Solid Oxide Fuel Cells", Journal of Power Sources, vol. 195. No, 24, Dec. 2010, pp. 8071-8074.
Goodenough et al., "Alternative anode materials for solid oxide fuel cells", J. Power Sources, vol. 173, Aug. 2007, pp. 1-10.

*Primary Examiner* — Jonathan G Leong
(74) *Attorney, Agent, or Firm* — Dority & Manning, PA

(57) ABSTRACT

In accordance with the present disclosure, a method for fabricating a symmetrical solid oxide fuel cell is described. The method includes synthesizing a composition comprising perovskite and applying the composition on an electrolyte support to form both an anode and a cathode.

8 Claims, 6 Drawing Sheets

MIXED IONIC AND ELECTRONIC CONDUCTOR BASED ON SR2FE2-XMOXO6 PEROVSKITE

CROSS-REFERENCE TO RELATED APPLICATION

The present application is a divisional application of U.S. patent application Ser. No. 13/020,356 having a filing date of Feb. 3, 2011, which is incorporated by reference herein and which is based on and claims priority to U.S. Provisional Application 61/337,365 having a filing date of Feb. 3, 2010, which is incorporated by reference herein.

GOVERNMENT SUPPORT CLAUSE

This invention was made with government support under DE-SC0001061 awarded by the U.S. Department of Energy and under 1210792 awarded by the U.S. National Science Foundation. The government has certain rights in the invention.

BACKGROUND

Solid oxide fuel cells (SOFCs) convert chemical energy from fuel directly to electricity. SOFCs offer high system efficiency and are environmentally benign. In a SOFC, a gas tight oxygen ion conducting electrolyte is sandwiched between two porous electrodes (anode and cathode). Electrodes are the critical components for a SOFC where the electrochemical reactions take place: fuel is oxidized in the anode while oxygen is reduced in the cathode. However, the development and widespread adoption of SOFC technology is hampered since the anode and cathode catalysts are deactivated during operation due to sulfur species binding to the surface of the anode catalyst and deposition of chromia on the surface of the cathode catalyst.

In order to improve the performance and reliability of both the anode and the cathode as well as to reduce the overall cost of the SOFC system, it would be desirable if the catalysts could be regenerated to remove the poisoning effects during operation.

Consequently, a novel approach to fabricate economical high performance SOFCs is desirable.

SUMMARY

In accordance with the present disclosure, a method for fabricating a symmetrical solid oxide fuel cell is described. The method includes synthesizing a composition comprising a perovskite and applying the composition on an electrolyte support to form both an anode and a cathode.

In yet another embodiment of the present disclosure, a symmetrical solid oxide fuel cell is described. The fuel cell includes an anode and a cathode each comprising a perovskite on opposite sides of an electrolyte support.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

In accordance with the present disclosure, a novel self-regenerating electrode for SOFCs is described. Both the anode and the cathode are the same material and the fuel cell can be operated by alternating the flow of the fuel and the oxidant. By operating the anode as a cathode, oxidant (typically air) will flush any sulfur species/carbon absorbed on the electrode, thereby regenerating the electrode from sulfur/coke poisoning. At the same time, by operating the cathode as an anode, steam (as a result of the fuel cell reaction) will flush any chromia deposited on the electrode surface, regenerating the electrode from chromia poisoning.

A ceramic-based anode with perovskite-type structure is one suitable structure contemplated as offering redox stability and mixed ionic and electronic conductivity with electro-catalytic activity in reducing environment. A double perovskite is also a suitable structure. With perovskite $Sr_2Fe_xMo_{2-x}O_{6-\delta}$ it has been shown that the nominal valence states of Fe and Mo in $Sr_2Fe_xMo_{2-x}O_{6-\delta}$ should be a combination of $Fe^{2+}$ ($3d^6$)/$Mo^{6+}$ ($4d^0$), or of $Fe^{3+}$ (3d)/

Mo$^{5+}$ (4d$^1$), or a mixture of these two. In the framework of a double exchange mechanism, there is formation of a hybridized Fe—O—Mo band and electron itinerancy. Moreover, the ability of Mo$^{6+}$ and Mo$^{5+}$ to form molybdyl ions allows a sixfold-coordinated Mo$^{6+}$ to accept an electron while losing an oxide ligand. Consequently, this material can potentially possess high electronic and oxygen-ion mixed conductivity.

The present disclosure can be better understood with reference to the following examples.

EXAMPLES

Example 1

Figure 1:
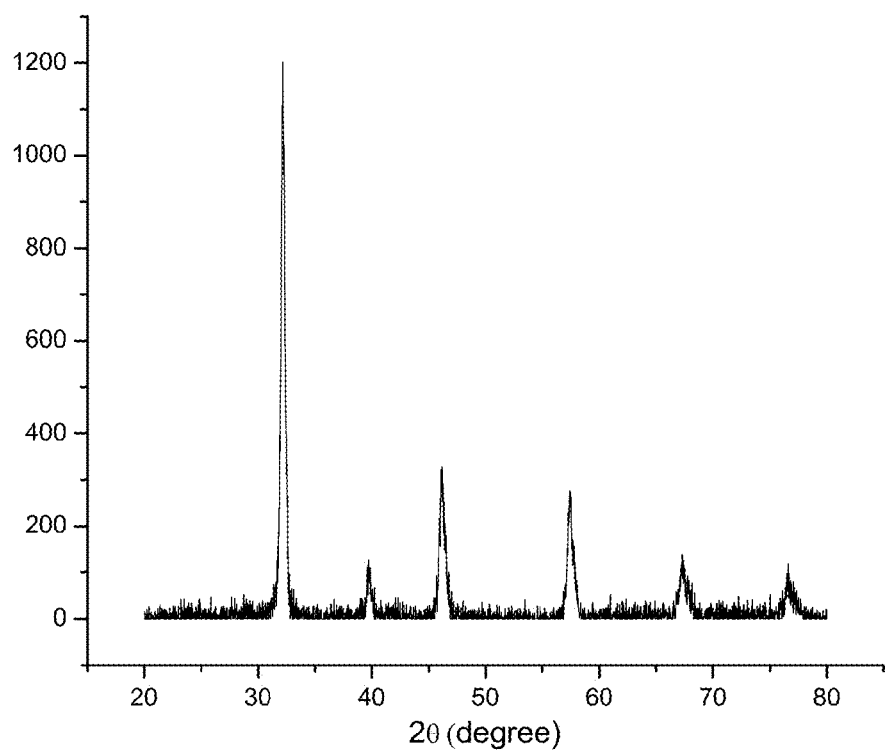
FIG. 1 illustrates an XRD of as-synthesized perovskite SFM in accordance with certain aspects of the present disclosure.

In accordance with the present disclosure, single phase perovskite Sr$_2$Fe$_{1.5}$Mo$_{0.5}$O$_{6-\delta}$ (SFM) has been synthesized by a combustion method as illustrated in FIG. 1. Sr(NO$_3$)$_2$, Fe(NO$_3$)$_3$.9H$_2$O, and (NH$_4$)$_6$Mo$_7$O$_{24}$.4H$_2$O were used as metal precursors. Polyvinyl alcohol (PVA) and citric acid were used as fuel; citric acid was also functioned to adjust the pH value. For the synthesis of 2 mmol of SFM, three metal precursors in stoichiometric ratio were dissolved in hot water (25 mL) together with PVA (1 g) at the same time, and a dark red suspension was formed. A clear solution was derived by adding citric acid (1 g) gradually. A clear solution (yellow color) of the metal precursor was obtained. The precursor was then transferred to a larger beaker and taken into a microwave for combustion. The as-synthesized porous products were then calcined at 1000° C. (3° C./min) for 5 h to get the pure phase SFM.

Electrolyte supported single cells were fabricated by dry-pressing method. The electrolyte support LSGMg was formed by co-pressing powder uniaxially under 200 MPa. The electrolyte film (13 mm in diameter) were then fired at 1400° C. in air for 5 h at a ramping rate of 2° C./min to densify the LSGMg membrane. A slurry consisting of SFM and a Heraeus binder V006 (weight ratio of 1:1) was then applied to the electrolyte by screen-printing, and then fired at 1100° C. in air for 3 h to form a porous electrode. The resulting coin shaped cathode had a thickness of 40 μm and an effective area of 0.33 cm$^2$. Inert gold slurries (Haraeus C8829) were brushed on the anode side as current collector.

The single cell was sealed on an alumina tube with silver paste (DAD-87, Shanghai Research Institute of Synthetic Resins). The cathode side was open to air, and the anode side was exposed to H$_2$ or (H$_2$ with 100 ppm H$_2$S) at a flow rate of 40 mL/min. The cell was heated to 800° C. and stabilized for 2 h before the electrochemical test was performed. Electrochemical characterizations were performed from 700° to 900° C. under ambient pressure. Fuel cell performance was measured with a Versa STAT 3-400 test system (Princeton Applied Research). AC impedance was measured at open cell circuit in the frequency range from 0.01 Hz to 100 kHz on a potentiostat/galvanostat with built-in impedance analyzer.

Bar pellets with size of 25×1.5×6 mm$^3$ were cold pressed to perform electrical conductivity measurement. Electrical conductivity of the samples was measured using a direct current four-probe method. Pt wire and Pt paste were used to make the four probes.

Figure 2:
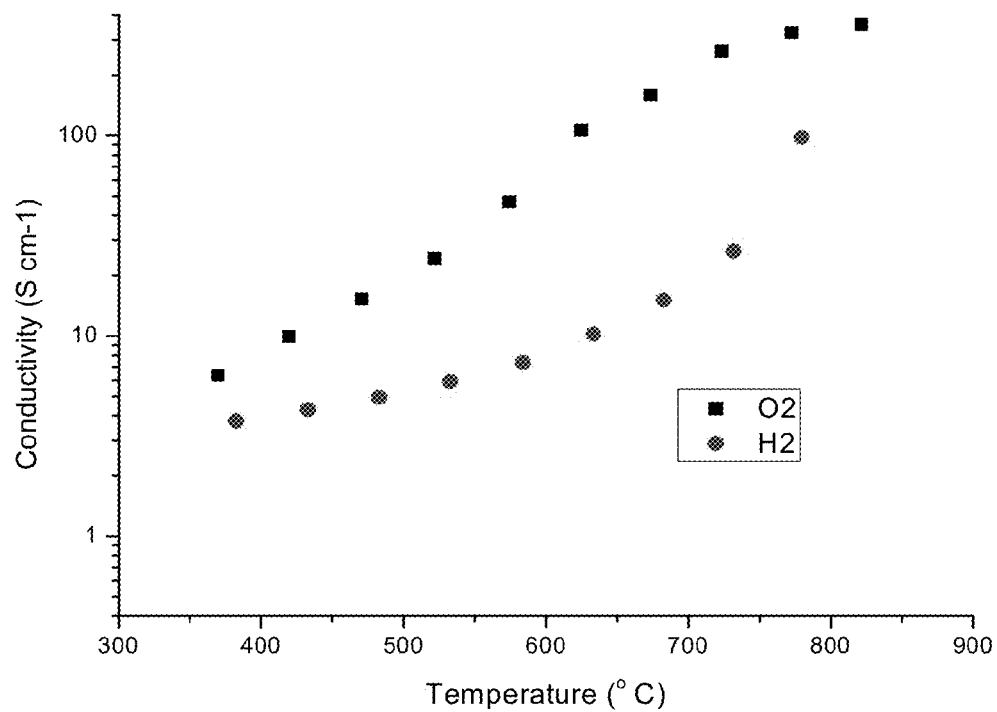
FIG. 2 illustrates electrical conductivity of SFM in air and hydrogen versus temperature in accordance with certain aspects of the present disclosure.
Figure 3:
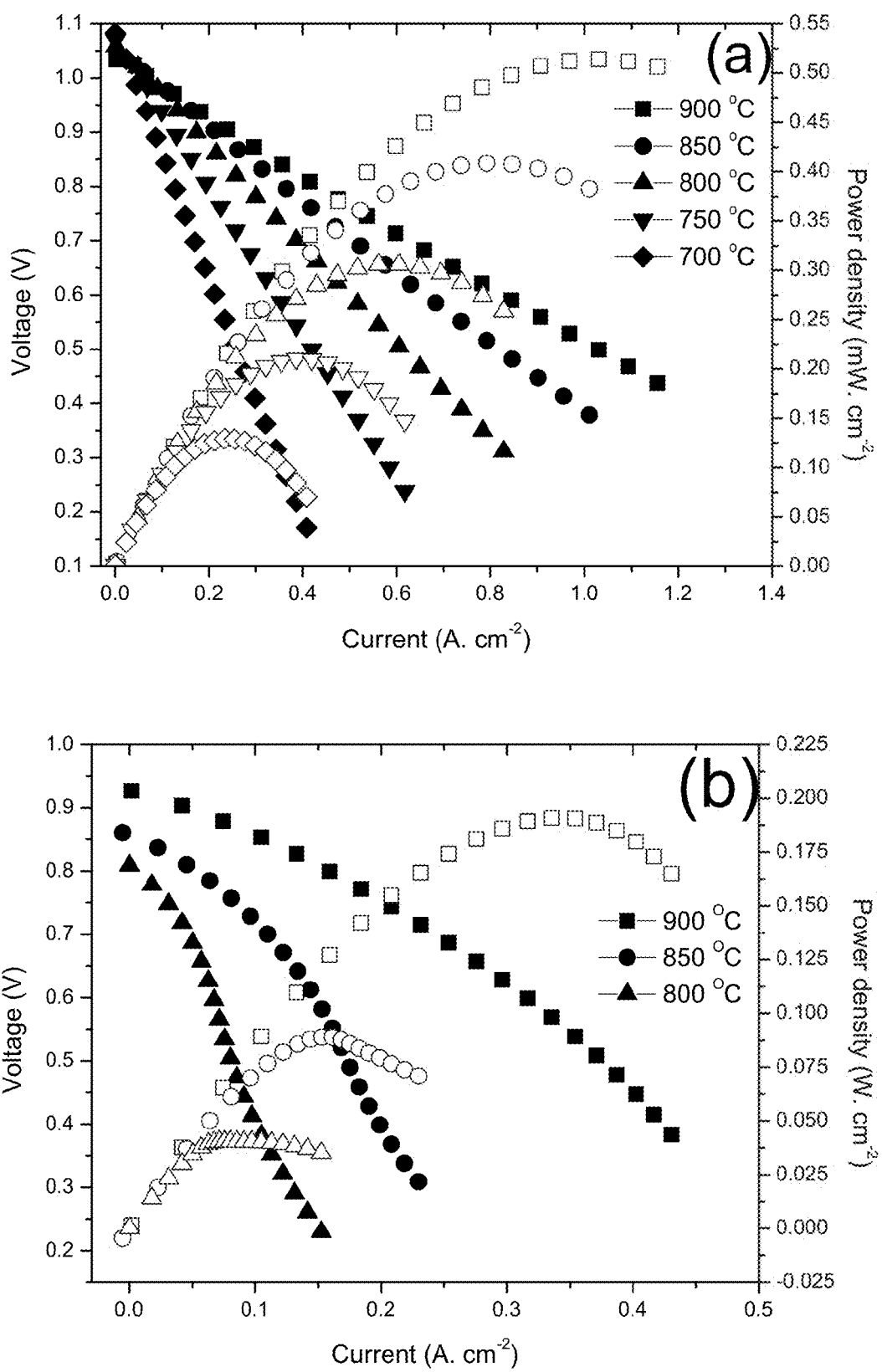
FIG. 3 illustrates voltage-current and power curves of single cell SFM/LSGM/SFM versus temperature (a) in hydrogen, and (b) in methane, in accordance with certain aspects of the present disclosure.

The electrical conductivity of SFM bar sample was tested in air and hydrogen respectively, showing good mixed ionic and electronic conductivity as illustrated in FIG. 2. The electrical conductivity for both was over 100 s·cm$^{-1}$ at 800° C. in air and hydrogen. The single cell SFM/LSGMg/SFM has been tested in methane and hydrogen. At 900° C., the power density can reach 500 mW·cm$^{-2}$ and 200 mW·cm$^{-2}$ in hydrogen and methane respectively (as illustrated in FIG. 3), showing very promising fuel cell performance. The cell with this unique structure has potential application in the field of 'self-regenerative' solid oxide fuel cells.

The above sections demonstrate how the SFM materials can be applied in SOFCs. Besides applications of the SFM as electrodes in SOFCs, SFM can also be used as electrode materials in solid oxide electrolysis cells. Further, SFM shows impressive mixed ionic and electronic conductivity and can be used as membrane materials in gas separation and chemical reactor designs. In addition, SFM can be used as a support material for catalyst loading in electrochemical, catalytic as well as chemical reaction processes.

Example 2

Figure 4:
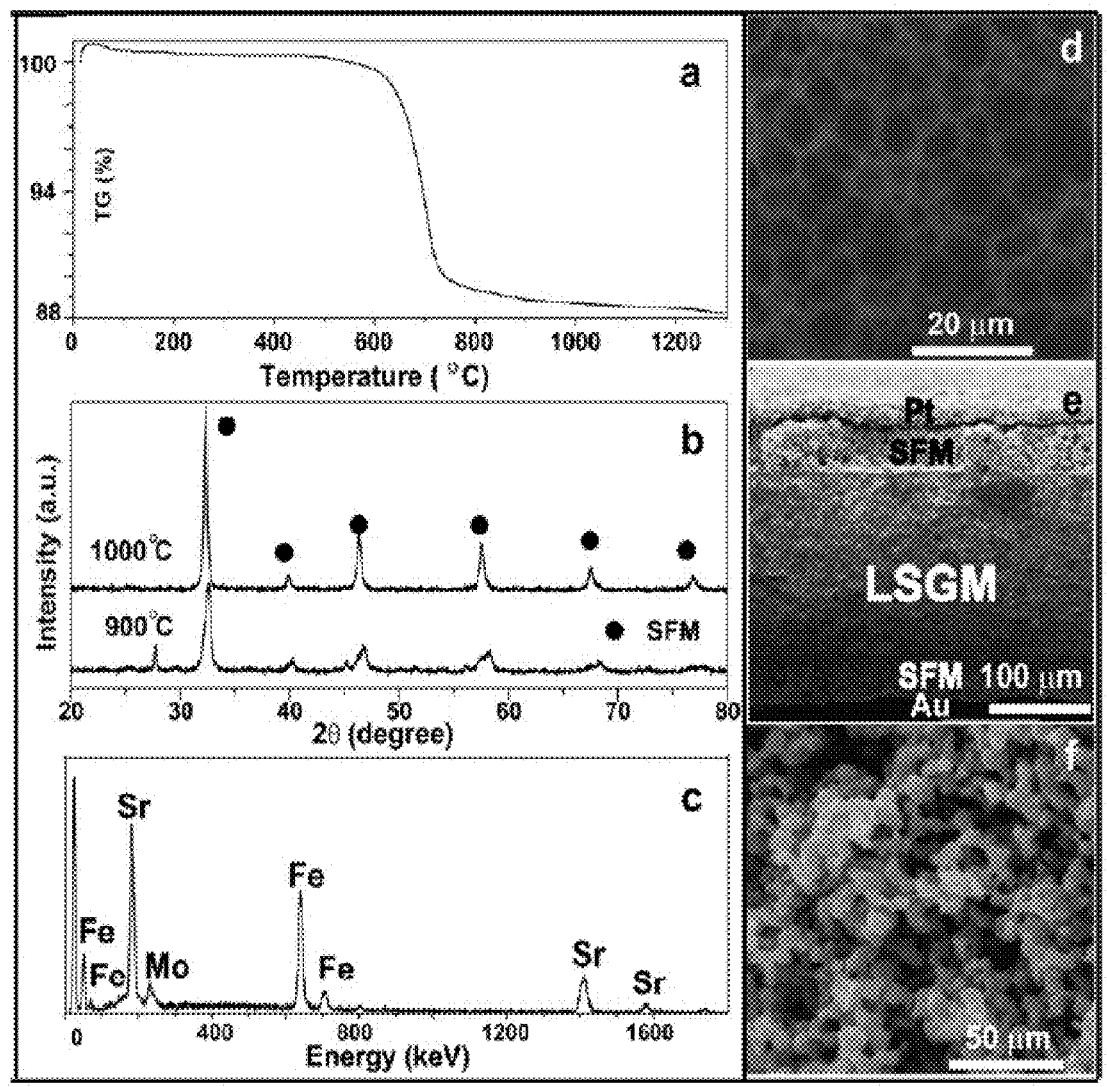
FIG. 4 illustrates a) TG analysis of as-synthesized SFM powders; b) XRD of SFM obtained in air after calcinations at 900° and 1000° C. for 5 h; c) EDX and d) SEM of as-synthesized SFM powders; e) low magnification SEM of cross sectional view of symmetrical single cells; f) high magnification SEM of SFM electrodes, in accordance with certain aspects of the present disclosure.

Shown in FIG. 4a is the thermogravimetric (TG) graph of the as synthesized SFM powders. Instant weight loss can be found around 700° C., which can be attributed to the removal of carbon (organic phase) residues. No obvious weight loss can be detected beyond 1000° C. XRD studies show that pure phase SFM can be synthesized on firing the precursor powders at 1000° C. (FIG. 4b). Atomic ratios of Sr, Fe and Mo are 2.02:1.51:0.48 as determined from EDX analysis, close to the nominal composition (FIG. 4c). SEM of the as-synthesized SFM powders displays a typical three-dimensionally macroporous morphology with an average macrospore size around several microns (FIG. 4d). The sponge-like porous structure can be observed over a range of hundreds of micrometers, which are believed to be beneficial to the enlargement of the triple phase boundary of the electrodes, thus enhancing the single cell performance. As shown in FIG. 4e, SFM has been applied as both hydrogen and oxygen electrodes for the symmetrical cells. High magnification SEM image (FIG. 4f) shows that worm-like particles together with porous frameworks are homogeneously distributed, which can facilitate gas diffusion and mass transport within the electrode layer.

Figure 5:
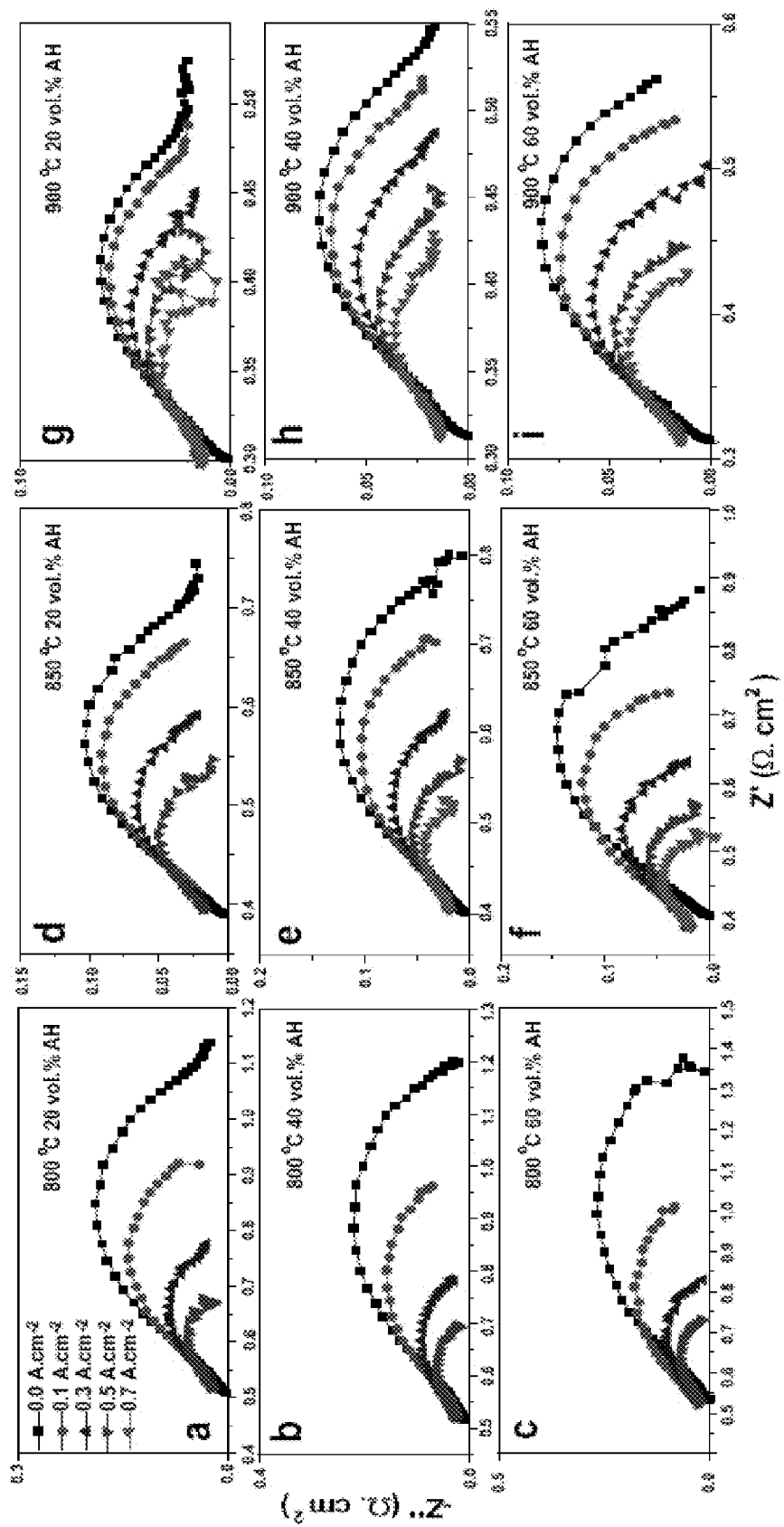
FIG. 5 illustrates impedance spectra of single cell SFM|LSGM|SFM recorded as a function of operating temperature, AH and DC current density, in accordance with certain aspects of the present disclosure.

The electrochemical impedance spectra of symmetrical cell with the configuration of SFM|LSGM|SFM were measured as a function of applied DC current density, operating temperature, and absolute humidity (AH) in the electrolysis mode and the results are shown in FIG. 5. The influence of the operating temperature on the cell performance can be clearly identified: both the ohmic resistance (intercept on the real impedance axis at high frequency, R$_O$) and electrode polarization resistance (intercept on the real impedance axis between the high and low frequency, R$_P$) decreased with the increase in the operating temperature. The influence of humidity in the feed stream on the cell performance can also be revealed from FIG. 5: R$_P$ increased slightly while R$_O$ remained the same with the increase in AH. Further, it can be seen from FIG. 5 that R$_P$ decreased with the increase in direct current (DC) current density while R$_O$ remained unaffected. From the above analysis, it can be concluded that R$_O$, which is related to the ohmic resistance of the cell and mainly comes from the electrolyte, is only temperature sensitive, while R$_P$ which is associated with the electrode process, is influenced by all the three factors: increase in the working temperature, decrease in humidity of the feed gas stream and increase in the DC current would all lead to a decrease in R$_P$. It should be noted that the absolute value of R$_P$ is also small for the symmetrical cell under the electrolysis operation and even smaller than that of the reported electrolysis cell with the configuration of LSM-YSZ|YSZ|Ni-YSZ. For example, under open circuit conditions and 60 vol. % AH, $R_P$ value varies from 0.83 Ωcm$^2$ at 800° C. (FIGS. 5c) to 0.26 Ωcm$^2$ at 900° C. (FIG. 5i), which is even smaller than that of $(La_{0.75}Sr_{0.25})_{0.95}MnO_3$ (LSM)-YSZ|YSZ|Ni-YSZ electrolysis cell tested in a lower AH (50 vol. % AH), in which $R_P$ values of 1.07 Ωcm$^2$ at 800° C. and 0.43 Ωcm$^2$ at 900° C. were observed. Consequently, it indicates that SFM is a very promising electrode material for SOECs based on the LSGM electrolyte.

The electrochemical characteristics of symmetrical cell with the configuration of SFM|LSGM|SFM was recorded at 800°, 850° and 900° C. as function of AH (20, 40 and 60 vol. % AH, respectively). The hydrogen carrier gas flow rate was set at 30 mL/min. The data were acquired by increasing the potential from 0.2 to 1.8 V with a 20 mV/s sweeping rate, while only part of the data recorded in the SOEC mode (from 0.9 to 1.3 V) were displayed in FIG. 6. Negative current densities indicate power consumption. Cell potential values at zero current density correspond to open circuit voltage (OCV). As presented in FIG. 6, OCV is influenced by the steam to hydrogen ratio, and increases when the steam to hydrogen ratio decreases, as predicted from the Nernst equation for the hydrogen-oxygen steam system.

Figure 6:
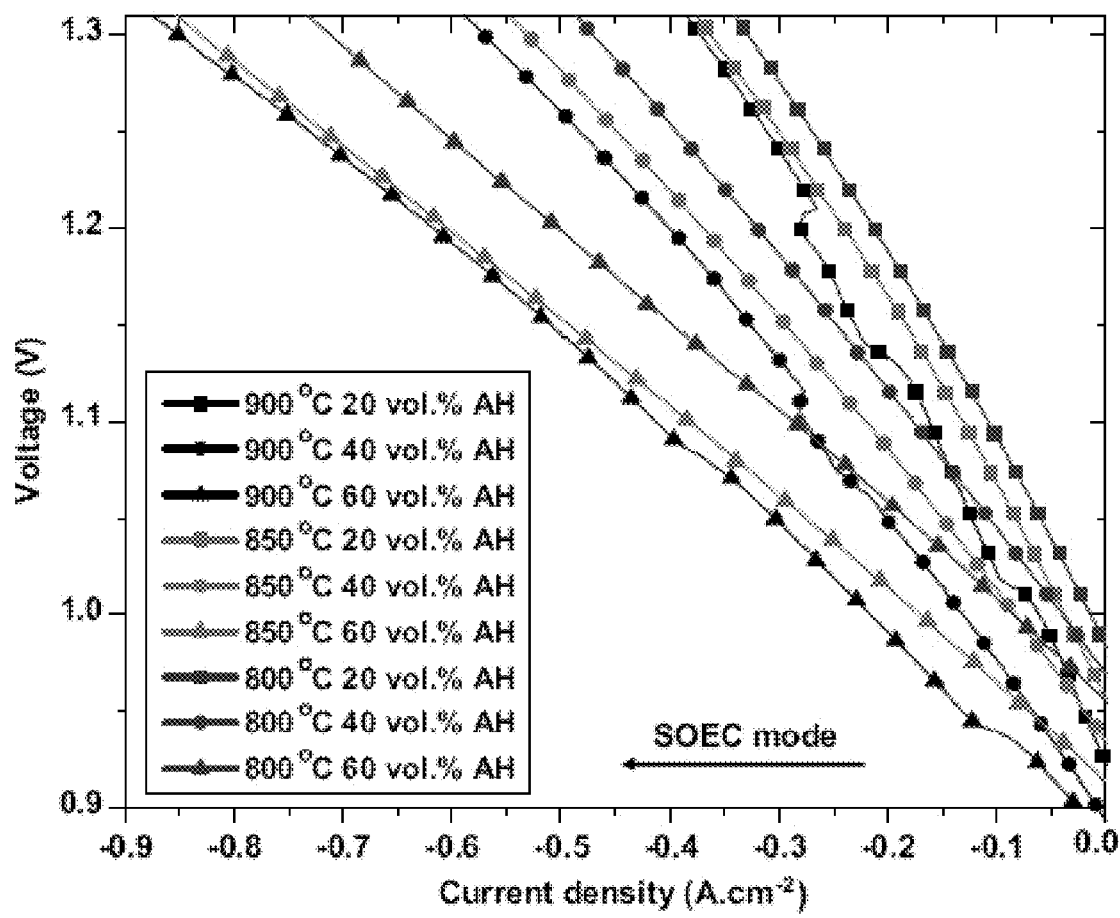
FIG. 6 illustrates voltage-current density of single cell SFM|LSGM|SFM recorded as a function of operating temperature and AH, in accordance with certain aspects of the present disclosure.
Figure 7:
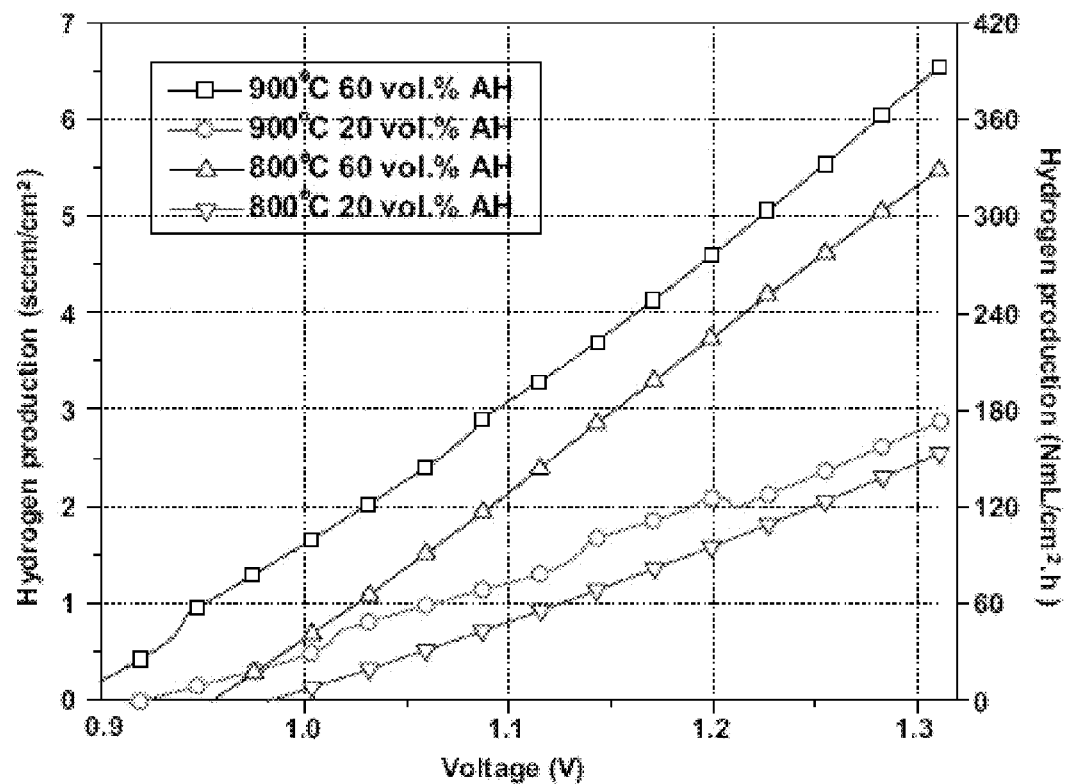
FIG. 7 illustrates hydrogen production of single cell SFM|LSGM|SFM operated at different AH and operating temperatures, in accordance with certain aspects of the present disclosure.

In the SOEC mode, the voltage varies linearly with the current density. It can be seen that the increase either in temperature or AH can lead to the improvement of the current density values. For example, a current density value of 0.48 A cm$^{-2}$ is observed at 800° C., while it increases to 0.59 A cm$^{-2}$ at 900° C. at 40 vol. % AH with a cell voltage of 1.3 V, as shown in FIG. 6; on the other hand, at 900° C., when the AH is increased from 20 to 60 vol. %, the current density shows a significant improvement, from 0.38 to 0.88 A cm$^{-2}$. Representative plots of hydrogen production rate during DC sweeping of 20 vol. % AH and 60 vol. % AH at 800 and 900° C., respectively, are shown in FIG. 7. The hydrogen production rate increases with the increase in the electrolysis voltages, the AH as well as the operating temperature of the electrolysis cell. With an electrolysis voltage of 1.3 V at 900° C. and 60 vol. % AH, a hydrogen production rate as high as 380 mL cm$^{-2}$ h has been achieved, which is even better than that of an electrolysis cell with the configuration of LSM-YSZ|YSZ|Ni-YSZ operated in a higher AH (80 vol. % AH), in which a hydrogen production rate of 362 mL cm$^{-2}$ h was obtained at the same operating temperature, indicating that SFM could be a very promising electrode material for high performance SOECs.

Figure 8:
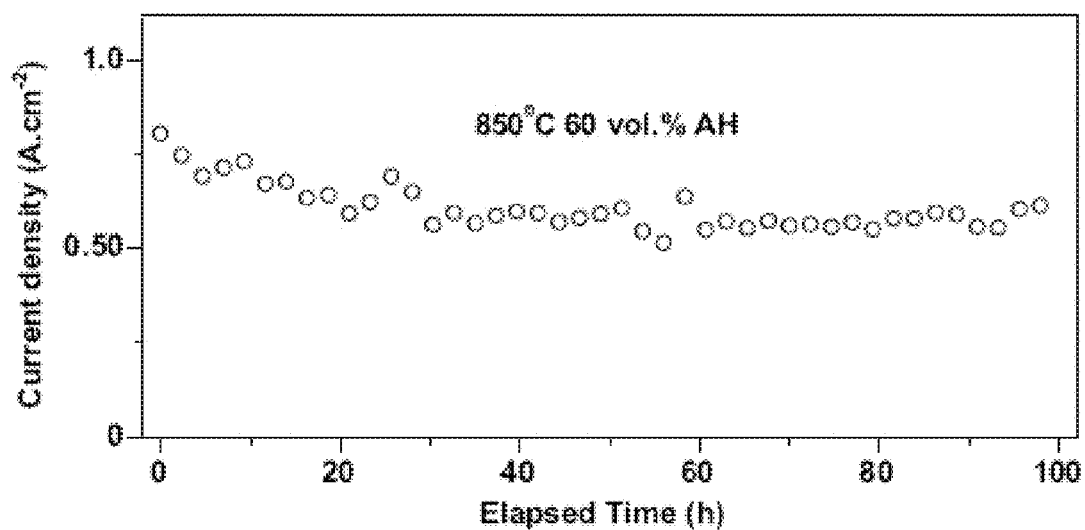
FIG. 8 illustrates long-term electrolysis testing of single cell SFM|LSGM|SFM with 1.2 V constant cell voltage operated at 850° C. and 60 vol. % AH.

The electrochemical stability of SFM electrode was tested at 850° C. and 60 vol. % AH. The cell was operated at a constant cell voltage of 1.2 V, and the cell current was recorded to evaluate the cell performance stability (FIG. 8). There was a minor drop in cell current density during the initial 10 h operation, which might be due to the increase in the cell resistance resulting from the conditioning of the electrode. After reaching the steady-state operation condition, there was no notable electrode passivation observed during the subsequent 90 h electrolysis operations, indicating that SFM is relatively stable under high temperature and high humidity environment.

In summary, symmetrical cell with the configuration of SFM|LSGM|SFM using perovskite SFM as both anode and cathode has been fabricated and tested in electrolysis mode for the first time in this work, showing better electrolysis performance than that of the state-of-art LSM-YSZ|YSZ|Ni-YSZ cell. Under open circuit conditions and 60 vol. % AH, the cell polarization resistance is as low as 0.26 Ωcm$^2$ at 900° C. An electrolysis current of 0.88 A cm$^{-2}$ and a hydrogen production rate of 380 mL cm$^{-2}$ h have been achieved at 900° C. with an electrolysis voltage of 1.3 V and 60 vol. % AH. In addition, the cell shows good stability during a steam electrolysis test for 100 h, indicating that SFM is a very promising electrode material for solid oxide fuel cells.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed is:

1. A symmetrical solid oxide fuel cell comprising:
   an anode and a cathode each comprising a perovskite comprising $Sr_2Fe_{1.5}Mo_{0.5}O_6$ on opposite sides of an electrolyte support.
2. The fuel cell of claim 1, wherein the perovskite is synthesized by a microwave-assisted combustion method.
3. The fuel cell of claim 1, wherein a dry-pressing method is utilized to form the electrolyte support.
4. The fuel cell of claim 1, wherein the perovskite is synthesized with a metal precursor.
5. The fuel cell of claim 1, wherein the pH is controlled during formation of the anode and cathode.
6. The fuel cell of claim 1, wherein perovskite slurry is utilized to form the anode and cathode.
7. The fuel cell of claim 1, further comprising operating the anode as a cathode.
8. The fuel cell of claim 1, further comprising operating the cathode as an anode.

* * * * *